US010200659B2

(12) United States Patent
Smolyanskiy et al.

(10) Patent No.: US 10,200,659 B2
(45) Date of Patent: Feb. 5, 2019

(54) COLLABORATIVE CAMERA VIEWPOINT CONTROL FOR INTERACTIVE TELEPRESENCE

(71) Applicant: Microsoft Technology Licensing, LLC, Redmond, WA (US)

(72) Inventors: Nikolai Smolyanskiy, Seattle, WA (US); Zhengyou Zhang, Bellevue, WA (US); Vikram R. Dendi, Redmond, WA (US); Michael Hall, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 317 days.

(21) Appl. No.: 15/056,922

(22) Filed: Feb. 29, 2016

(65) Prior Publication Data
US 2017/0251180 A1 Aug. 31, 2017

(51) Int. Cl.
*H04N 7/18* (2006.01)
*H04N 5/232* (2006.01)
(Continued)

(52) U.S. Cl.
CPC ........... *H04N 7/185* (2013.01); *G02B 27/017* (2013.01); *G05D 1/0016* (2013.01);
(Continued)

(58) Field of Classification Search
CPC ............. H04N 21/21805; H04N 7/181; H04N 21/4756; G06T 2207/30241
See application file for complete search history.

(56) References Cited

U.S. PATENT DOCUMENTS 4,516,156 A 5/1985 Fabris et al.
7,613,999 B2 11/2009 Weber et al.
(Continued)

FOREIGN PATENT DOCUMENTS

CN 105120146 12/2015
WO WO-2015179797 11/2015

OTHER PUBLICATIONS

"International Search Report and Written Opinion", Application No. PCT/US2017/019226, dated Apr. 25, 2017, 12 pages.
(Continued)

*Primary Examiner* — Obafemi O Sosanya
(74) *Attorney, Agent, or Firm* — Schwegman Lundberg & Woessner, P.A.

(57) ABSTRACT

In embodiments of collaborative camera viewpoint control for interactive telepresence, a system includes a vehicle that travels based on received travel instructions, and the vehicle includes a camera system of multiple cameras that each capture video of an environment in which the vehicle travels from different viewpoints. Viewing devices receive the video of the environment from the different viewpoints, where the video of the environment from a selected one of the viewpoints is displayable to users of the viewing devices. Controller devices that are associated with the viewing devices can each receive a user input as a proposed travel instruction for the vehicle based on the selected viewpoint of the video that is displayed on the viewing devices. A trajectory planner receives the proposed travel instructions initiated via the controller devices, and generates a consensus travel instruction for the vehicle based on the proposed travel instructions.

20 Claims, 6 Drawing Sheets

(51) Int. Cl.
*G06T 19/00* (2011.01)
*G02B 27/01* (2006.01)
*G05D 1/00* (2006.01)
*G06Q 10/10* (2012.01)

(52) U.S. Cl.
CPC ......... *G06Q 10/101* (2013.01); *G06T 19/006* (2013.01); *H04N 5/23296* (2013.01); *G02B 2027/0178* (2013.01)

(56) References Cited

U.S. PATENT DOCUMENTS

| | | | |
|---|---|---|---|
| 7,710,448 | B2 | 5/2010 | De Beer et al. |
| 8,903,568 | B1 | 12/2014 | Wang et al. |
| 8,947,497 | B2 | 2/2015 | Hines et al. |
| 2002/0138847 | A1 | 9/2002 | Abrams et al. |
| 2003/0132951 | A1 | 7/2003 | Sorokin et al. |
| 2009/0037033 | A1 | 2/2009 | Phillips |
| 2009/0118896 | A1* | 5/2009 | Gustafsson ............ G05D 1/104 701/31.4 |
| 2010/0131103 | A1 | 5/2010 | Herzog et al. |
| 2010/0245535 | A1 | 9/2010 | Mauchly |
| 2012/0287284 | A1 | 11/2012 | Jacobsen et al. |
| 2013/0176423 | A1 | 7/2013 | Rischmuller et al. |
| 2015/0100461 | A1 | 4/2015 | Baryakar et al. |
| 2015/0127156 | A1 | 5/2015 | Wang et al. |
| 2015/0312520 | A1 | 10/2015 | Nohria et al. |
| 2015/0346722 | A1 | 12/2015 | Herz et al. |
| 2015/0370250 | A1 | 12/2015 | Bachrach et al. |
| 2016/0054733 | A1 | 2/2016 | Hollida et al. |
| 2016/0192009 | A1* | 6/2016 | Sugio ................. H04N 21/4756 725/32 |

OTHER PUBLICATIONS

Goldberg, "Collaborative Online Teleoperation with Spatial Dynamic Voting and a Human "Tele-Actor"", In Proceedings of the IEEE International Conference on Robotics and Automation, vol. 2, May 11, 2002, 6 pages.

Manuaba, "Evaluation of gaming environments for mixed reality interfaces and human supervisory control in telerobotics", In Thesis of Australian National University, Apr. 2004, 230 pages.

* cited by examiner

COLLABORATIVE CAMERA VIEWPOINT CONTROL FOR INTERACTIVE TELEPRESENCE

BACKGROUND

Remotely controlled vehicles have become increasingly popular, particularly with respect to mobilized robots, land rovers, and unmanned aerial vehicles (UAVs), also commonly referred to as "drones". Typically, these types of vehicles include a camera or cameras that allow video of the environment in which a vehicle operates to be captured and transmitted back to an operator of the vehicle for display on a display screen at the operator's location. This provides a first person view of what the operator would see if he or she were at the vehicle's location, or traveling on the vehicle. These types of remotely controlled vehicles typically have a one-to-one correspondence, or pairing, between the operator and the vehicle for teleoperation, where a user input is communicated to the vehicle, which then performs accordingly. Other types of systems only provide a user with telepresence, where the user may simply watch video and/or hear audio of a remote environment, but without being able to control the vehicle, device, or system sending back the video and audio of the remote environment.

SUMMARY

This Summary introduces features and concepts of collaborative camera viewpoint control for interactive telepresence, which is further described below in the Detailed Description and/or shown in the Figures. This Summary should not be considered to describe essential features of the claimed subject matter, nor used to determine or limit the scope of the claimed subject matter.

Collaborative camera viewpoint control for interactive telepresence is described. In embodiments, a system includes a vehicle that travels based on received travel instructions, and the vehicle includes a camera system of multiple cameras that each capture video of an environment in which the vehicle travels from different viewpoints. The vehicle may be any type of a drone, a submersible, a land rover, a mobilized computing device, a human camera carrier, and/or any other type of a camera transport. Viewing devices receive the video of the environment from the different viewpoints, and the video of the environment from a selected one of the viewpoints is displayable to users of the viewing devices. A travel user interface can be displayed over the video of the environment on the viewing devices, and the travel user interface depicts selectable travel options for the vehicle. The viewing devices may be any type of a virtual reality headset or glasses, an augmented reality headset or glasses, a mobile device with an integrated display, and/or a display device coupled to a computing device. Controller devices that are associated with the viewing devices can each receive a user input as a proposed travel instruction for the vehicle based on the selected viewpoint of the video that is displayed on the viewing devices. A trajectory planner receives the proposed travel instructions initiated via the controller devices, and generates a consensus travel instruction for the vehicle based on the proposed travel instructions.

In other aspects, the trajectory planner can be implemented with a voting system to generate the consensus travel instruction based on each of the proposed travel instructions that are counted as a user vote to direct the travel of the vehicle. The vehicle includes a travel control system to control the travel of the vehicle, and the travel control system can also generate a voting input to the voting system to direct the travel of the vehicle. The trajectory planner communicates the consensus travel instruction to the travel control system effective to instruct the vehicle how to travel. In implementations, travel of the vehicle can include any type of travel, to include stop, brake, start, accelerate, turn-off the vehicle, turn-on the vehicle, travel up, travel down, turn left, turn right, turn around, rotate, travel forward, and travel back. The trajectory planner can also be implemented with a policy system to generate the consensus travel instruction based on each of the proposed travel instructions counted as a weighted vote to direct the travel of the vehicle.

In other aspects, the camera system of the vehicle includes the multiple cameras to capture the video of the environment in which the vehicle travels from different viewpoints. A group of the viewing devices can receive the video of the environment from the viewpoint of one of the cameras, and one or more additional groups of the viewing devices can receive the video of the environment from different viewpoints of other cameras. Additionally, the controller devices can each be implemented to receive an additional user input as a proposed camera viewpoint of at least one of the cameras. The trajectory planner can then receive the proposed camera viewpoints based on the different viewpoints of the environment. The trajectory planner receives the proposed camera viewpoints initiated via the controller devices, and generates a consensus camera viewpoint for the at least one camera based on the proposed camera viewpoints.

BRIEF DESCRIPTION OF THE DRAWINGS

Embodiments of collaborative camera viewpoint control for interactive telepresence are described with reference to the following Figures. The same numbers may be used throughout to reference like features and components that are shown in the Figures.

DETAILED DESCRIPTION

Figure 1:
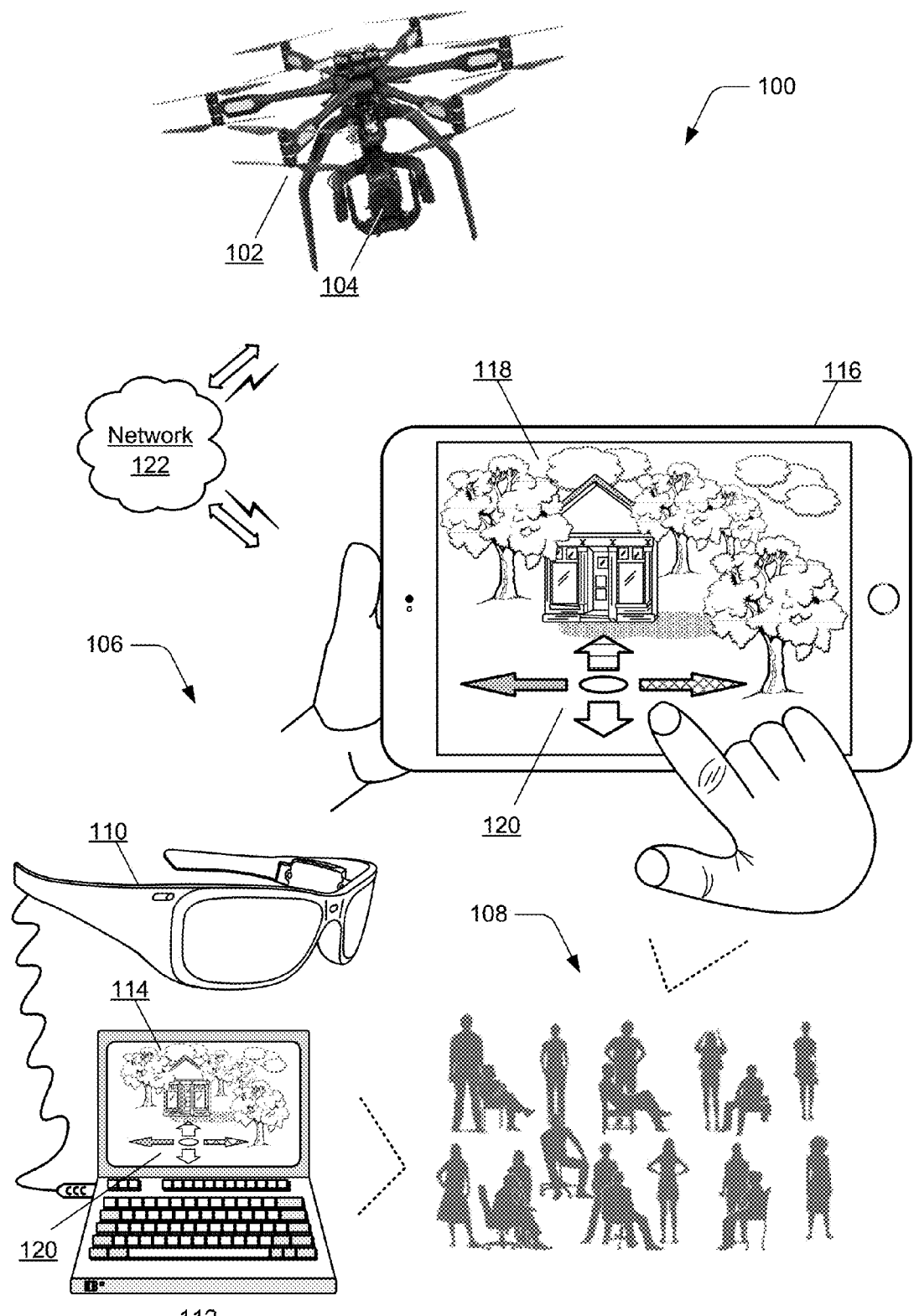
FIG. 1 illustrates an example system in which embodiments of collaborative camera viewpoint control for interactive telepresence can be implemented.

Embodiments of collaborative camera viewpoint control for interactive telepresence are described, and can be implemented to provide a group of users collaborative control of a vehicle and/or a camera system that is transported by the vehicle for an interactive telepresence in the environment in which the vehicle travels. The group of users can interact with the remote environment collaboratively, in the context of crowdsourcing, to control camera movement to reposition the camera viewpoint, and/or to control the vehicle travel to reposition the camera viewpoint. A vehicle that transports a camera system may be any one or combination of a drone, a submersible, a land rover, a mobilized computing device, a human camera carrier, and/or any other type of a camera transport. The camera system can include one or more cameras to capture video in two-dimensional or three-dimensional space of the environment in which the vehicle travels, such as when flying as a drone, traveling over land or in a building structure as a land rover, traveling in water as a submersible (e.g., under water or floating on top), or as any other vehicle implemented as a camera transport.

The camera devices of a camera system can operate together to capture the video of the environment from a common viewpoint, or operate independently to each capture the video of the environment from a different viewpoint. The video of the environment from the different viewpoints is then displayable to any number of the users with viewing devices that receive the video of the environment as captured by the camera system on the vehicle. Any of the users may be using different types of viewing devices, such as any type of a virtual reality headset, virtual reality glasses, an augmented reality headset, augmented reality glasses, a mobile device with an integrated display, and/or a display device coupled to a computing device.

The viewing devices of the many users can each be associated with a controller device via which a user can initiate a user input as a proposed travel instruction for the vehicle. In implementations, a viewing device and controller device may be integrated, such as in mobile devices carried by any number of the users that collaborate to control the viewpoint of the camera system on the vehicle. The controller devices each receive user inputs as a proposed travel instruction for the vehicle and/or as a proposed camera viewpoint for the camera system, and the collective user inputs are proposed travel instructions and proposed camera viewpoints communicated back to the vehicle.

The vehicle implements a travel control system that controls the travel of the vehicle, and implements a trajectory planner that can receive the proposed travel instructions and/or the proposed camera viewpoints initiated by the group of users via the controller devices. The trajectory planner can then generate a consensus travel instruction for the vehicle based on the proposed travel instructions, and communicate the consensus travel instruction to the travel control system of the vehicle, which is effective to instruct the vehicle how to travel (e.g., any one or combination of stop, brake, start, accelerate, turn-off the vehicle, turn-on the vehicle, travel up, travel down, turn left, turn right, turn around, rotate, travel forward, and travel back). The trajectory planner can also generate a consensus camera viewpoint for the camera system based on the proposed camera viewpoints, and communicate the consensus camera viewpoint to reposition the camera system of the vehicle.

While features and concepts of collaborative camera viewpoint control for interactive telepresence can be implemented in any number of different devices, systems, networks, environments, and/or configurations, embodiments of collaborative camera viewpoint control for interactive telepresence are described in the context of the following example devices, systems, and methods.

FIG. 1 illustrates an example system 100 in which embodiments of collaborative camera viewpoint control for interactive telepresence can be implemented. The example system 100 includes a vehicle 102, shown represented in this example as an unmanned aerial vehicle (UAV), also commonly referred to as a drone. In implementations, the vehicle 102 can be any one or combination of a drone, a submersible, a land rover, a mobilized computing device, and/or a camera transport. The vehicle 102 includes a camera system 104 that is implemented to capture video in two-dimensional or three-dimensional space of the environment in which the vehicle travels, such as when flying as a drone, traveling over land or in a building structure as a land rover, traveling in water as a submersible (e.g., under water or floating on top), or as any other vehicle implemented as a camera transport. The camera system 104 can include one or more camera devices, and the camera devices can operate together to capture the video of the environment from a common viewpoint, or operate independently to each capture the video of the environment from a different viewpoint.

The example system 100 also includes multiple viewing devices 106 that receive the video of the environment from different viewpoints as captured by the camera system 104 on the vehicle 102. The video of the environment from a selected one of the viewpoints is then displayable to any number of users 108 of the viewing devices. The different viewpoints of the environment, as captured in the video from the multiple cameras, can be ranked, such as determined by camera usage statistics, viewpoint statistics, selected popularity, and/or by user selection. For example, the users of a group can select the video of a particular viewpoint to be displayed on the viewing devices, such as by user voting to select a particular camera. In implementations, any of the users may be using different types of viewing devices 106, such as any type of a virtual reality headset, virtual reality glasses, an augmented reality headset, augmented reality glasses, a mobile device with an integrated display, and/or a display device coupled to a computing device. For example, a user may view the video received from the vehicle 102 in virtual or augmented reality glasses 110 that are associated with a controller device, such as a laptop computer 112 in this instance. In addition to being displayed in the virtual or augmented reality glasses 110, the video of the environment received from the vehicle 102 is also shown displayed on the integrated display 114 of the laptop computer.

Each of the viewing devices 106 of the many users 108 can be associated with a controller device, such as the laptop computer 112, via which a user can initiate a user input as a proposed travel instruction for the vehicle. In implementations, a viewing device and controller device may be integrated, such as in mobile devices carried by any number of the users 108 that collaborate to control the viewpoint of the camera system 104 on the vehicle 102. For example, a mobile device, such as a mobile phone or a tablet device 116, includes an integrated display 118 to display the video of the environment received from the vehicle 102. In embodiments, a group of users can collaborate to control the viewpoint of the camera system 104 that is transported by the vehicle 102 for an interactive telepresence in the environment in which the vehicle travels. The group of users can interact with the remote environment collaboratively, in the context of crowdsourcing to control camera movement to reposition the camera viewpoint, and/or to control the vehicle travel to reposition the camera viewpoint.

The example system 100 also includes a travel user interface 120, as shown displayed over the video of the environment on the viewing devices, such as over the video on the integrated display 114 of the laptop computer 112, and over the video on the integrated display 118 of the tablet device 116. Although not shown, the travel user interface 120 can also be displayed for viewing in the virtual or augmented reality glasses 110, as well as in or on any of the other viewing devices and/or display devices described herein. Additionally, audio of the environment in which the vehicle 102 travels may also be communicated to the viewing devices so that a user may both watch the video and listen to the corresponding audio for a realistic interactive telepresence in the environment in which the vehicle travels. The travel user interface 120 depicts selectable travel options for the vehicle 102, such as based on the selected viewpoint of the video that is displayed on the viewing devices, and each of the users of a viewing and/or controller device can select one of the displayed selectable travel options. The travel user interface displayed at each viewing device then receives a user input as a proposed travel instruction for the vehicle, and the collective user inputs are proposed travel instructions communicated back to the vehicle 102.

Although a stop position at the center circle and only four selectable directions of travel are shown by the arrows in the travel user interface 120 in this example, travel of the vehicle may be defined to include any one or combination of instructions to stop, brake, start, accelerate, turn-off the vehicle, turn-on the vehicle, travel up, travel down, turn left, turn right, turn around, rotate, travel forward, and travel back. Any of these travel instructions and directions may be used to reposition the camera viewpoint of the camera system 104 that is transported by the vehicle 102. Additionally, the selectable travel options for the vehicle 102 in the travel user interface 120 can be displayed to reflect and/or relay other direction of travel information to the group of users that view the video on any one of the viewing devices 106.

For example, colors, labels, fill patterns, line weights, and any other types of graphics can be used to convey travel information. In this example, the right direction arrow includes a fill pattern to indicate a warning, such as the tree obstacle that may be encountered if the group of users collectively propose to instruct the vehicle 102 to turn right and travel in that direction. Further, the forward (or straight-ahead) direction arrow includes a different fill pattern that may indicate caution if selecting to continue travel of the vehicle 102 in that direction towards the building, although the vehicle may still be able to move in that direction. Other indicators may be used to convey or identify the least proposed direction of travel and/or the most proposed direction of travel by the group of users, such as to turn left and have the vehicle 102 travel in that direction, as noted by the fill-color of the left direction arrow.

Any of the controller devices (e.g., the laptop computer 112 and the tablet device 116) that are associated with the viewing devices 106 used by the group of users may also be implemented to recognize audio and/or gesture inputs as each of the user inputs of a proposed travel instruction for the vehicle 102, or as a proposed camera viewpoint for a camera of the camera system 104. Additionally, the viewing devices may display a speech recognition-based user interface, or a gesture recognition-based user interface to detect user intent when initiating an input as a proposed travel instruction or as a proposed camera viewpoint. As described above, a group of users can collaborate to control travel of the vehicle 102 to reposition the camera viewpoint of the camera system 104, such as with the controller devices used to initiate user inputs via the travel user interface 120 displayed on the viewing devices. Alternatively or in addition, the group of users can collaborate to move the camera system and control the viewpoint of one or more of the cameras, such as when the vehicle 102 is stationary, or even when the vehicle is traveling. In embodiments, the controller devices can also be implemented to receive inputs from the users as proposed camera viewpoints of the one or more cameras of the camera system 104 that is transported by the vehicle 102.

The example system 100 includes a network 122, and any of the devices, servers, and/or services described herein can communicate via the network, such as for video and data communication between the viewing and/or controller devices and the vehicle 102. The network can be implemented to include a wired and/or a wireless network. The network can also be implemented using any type of network topology and/or communication protocol, and can be represented or otherwise implemented as a combination of two or more networks, to include IP based networks and/or the Internet. The network may also include mobile operator networks that are managed by a mobile network operator and/or other network operators, such as a communication service provider, mobile phone provider, and/or Internet service provider.

In this example system 100, the vehicle 102 implements a travel control system that controls the travel of the vehicle, and implements a trajectory planner that is shown and described in more detail with reference to FIG. 2. The trajectory planner of the vehicle 102 can receive the proposed travel instructions initiated by the group of users via the controller devices, and generate a consensus travel instruction for the vehicle based on the proposed travel instructions. The trajectory planner can then communicate the consensus travel instruction to the travel control system of the vehicle, which is effective to instruct the vehicle how to travel (e.g., any one or combination of stop, brake, start, accelerate, turn-off the vehicle, turn-on the vehicle, travel up, travel down, turn left, turn right, turn around, rotate, travel forward, and travel back).

Similarly, the trajectory planner of the vehicle 102 can receive the proposed camera viewpoints initiated by the group of users via the controller devices, and generate a consensus camera viewpoint for one or more of the cameras of the camera system 104 based on the proposed camera viewpoints. The trajectory planner can then communicate the consensus camera viewpoint to the camera system 104 to change the viewpoint of the camera system as it captures the video of the environment in which the vehicle travels.

In alternate implementations, a cloud-based data service can be utilized to implement the trajectory planner as a computer application that receives the proposed travel instructions initiated by the group of users via the controller devices. The trajectory planner at the cloud-based data service can then generate and communicate the consensus travel instruction to the travel control system that controls the travel of the vehicle 102, where the consensus travel instruction is effective to instruct the vehicle how to travel. Similarly, the trajectory planner implemented at the cloud-based data service can also receive the proposed camera viewpoints initiated by the group of users via the controller devices. The trajectory planner at the cloud-based data service can then generate and communicate the consensus camera viewpoint to camera system 104 to reposition one or more of the cameras of the camera system. This cloud-based data service system is shown and described in more detail with reference to FIG. 3.

In embodiments, the trajectory planner of the vehicle 102 (or implemented at a cloud-based data service) can be implemented with a policy system and/or a voting system to generate the consensus travel instruction based on each of the proposed travel instructions counted as a user vote to direct the travel of the vehicle. The travel control system of the vehicle 102 may also generate a voting input to the voting system of the trajectory planner to direct the travel of the vehicle. In implementations, the voting input of the travel control system can be weighted to account for instances when the consensus travel instruction that is generated based on the group input is overridden, such as for obstacle avoidance by the vehicle. In addition, the policy system of the trajectory planner may contribute to generate the consensus travel instruction based on each of the proposed travel instructions counted as a weighted vote to direct the travel of the vehicle.

As a matter of policy for example, some user inputs of proposed travel instructions and/or proposed camera viewpoints may be weighted higher or lower based on user factors, such as whether the user appears to intentionally provide poor input, the age or experience of the user, a skill level of the user with the particular type of vehicle, and any other type of factor that may be considered when weighting user inputs. Additionally, the policy system may include a monetized aspect by which a user can pay to control the vehicle, such as for a duration of time or for a duration of travel, or the user may have his or her input weighted significantly greater than the other users of the group that are contributing to the collaborative effort of camera viewpoint control for the interactive telepresence experience.

The trajectory planner and travel control system of the vehicle 102 may also be implemented to override the consensus travel instruction that is generated based on the group input as a matter of policy for some other undesirable travel result, such as a travel instruction to shut off an aerial drone while it is flying, or to avoid sudden and/or erratic motions of the vehicle that may lead to motion sickness in the users viewing the video of the environment with the viewing devices 106. In some instances, the policy system may override the voting system, as noted above, to prevent an undesirable outcome of the vehicle travel that would affect all of the users of the group who are collaborating for an interactive telepresence in the environment in which the vehicle travels.

As noted above, the camera system 104 that is transported by the vehicle 102 may include more than one camera device, and each of the camera devices can operate together to capture the video of the environment in which the vehicle travels from a common viewpoint, or may operate independently to each capture the video of the environment from a different viewpoint. In embodiments, a group of the viewing devices can receive the video of the environment from the viewpoint of one of the cameras, and one or more additional groups of the viewing devices can receive the video of the environment from different viewpoints of other cameras. The users of the viewing devices and the associated controller devices may each select which of the video feeds from the camera system 104 of the vehicle 102 to watch based on the different camera viewpoints. The trajectory planner can then receive the proposed travel instructions and/or the proposed camera viewpoints based on the different viewpoints of the environment from the different cameras.

For example, viewers of a sporting event may select from several different video feeds, and a group of users associated with a particular video feed can then propose vehicle travel instructions and/or propose camera viewpoints to collaboratively control the interactive telepresence experience related to the sporting event and the camera that captures the particular video feed. In implementations, the viewers may select which video feed to watch from a list or other arrangement of video feeds, such as based on rank and/or popularity, where the most popular camera viewpoint is more prominently displayed (e.g., at the top of the list of the several video feeds). A display of video on a viewing device of a user may be implemented to switch to another video feed based on the relevance what the video is capturing, such as in the example of the sporting event. A viewer may want the video feed to switch based on a more exciting event happening during the sporting event that is captured by a different camera. The video feed may be switched as selected by a user of a viewing device, or the video feed can be switched to a different camera viewpoint based on camera usage statistics, viewpoint statistics, selected popularity of a common viewpoint, and the like.

Figure 2:
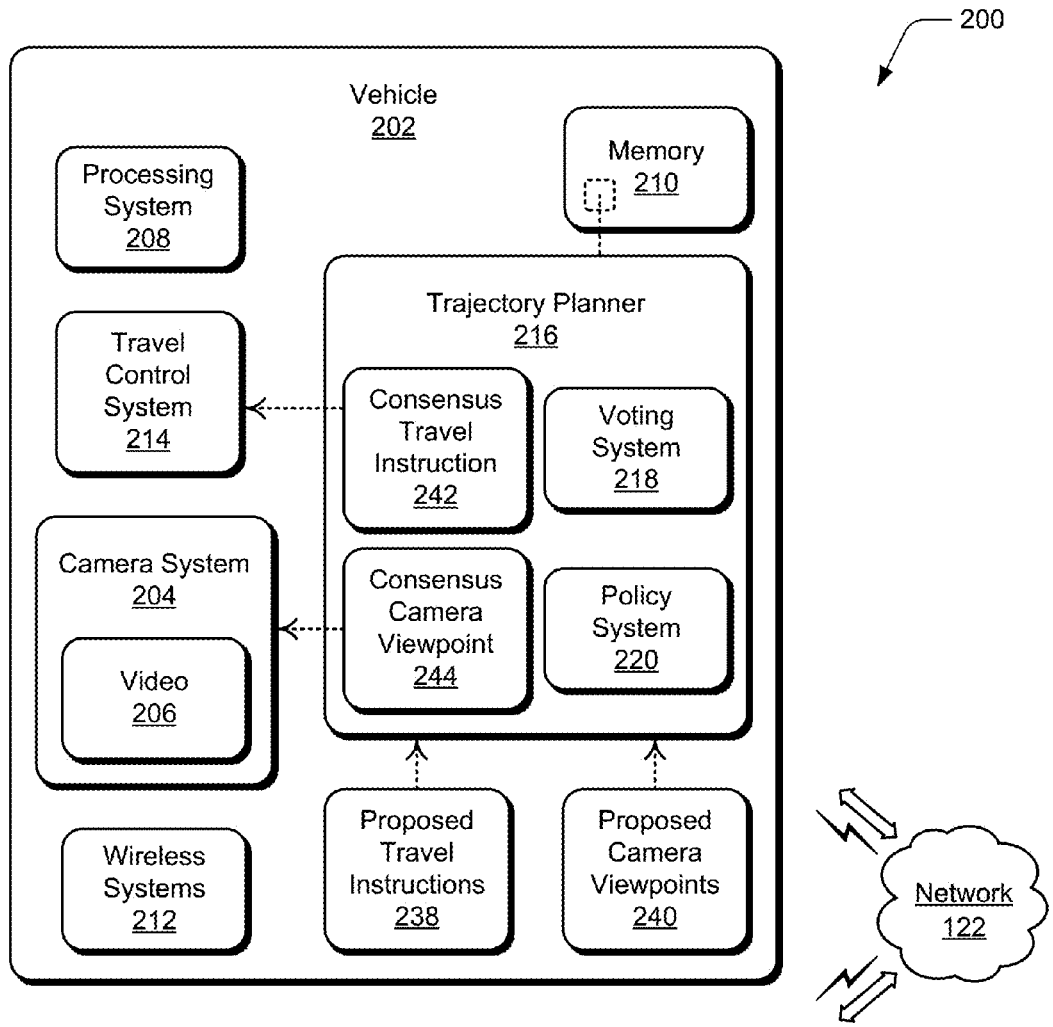
FIG. 2 further illustrates the example system in which embodiments of collaborative camera viewpoint control for interactive telepresence can be implemented.
Figure 2:
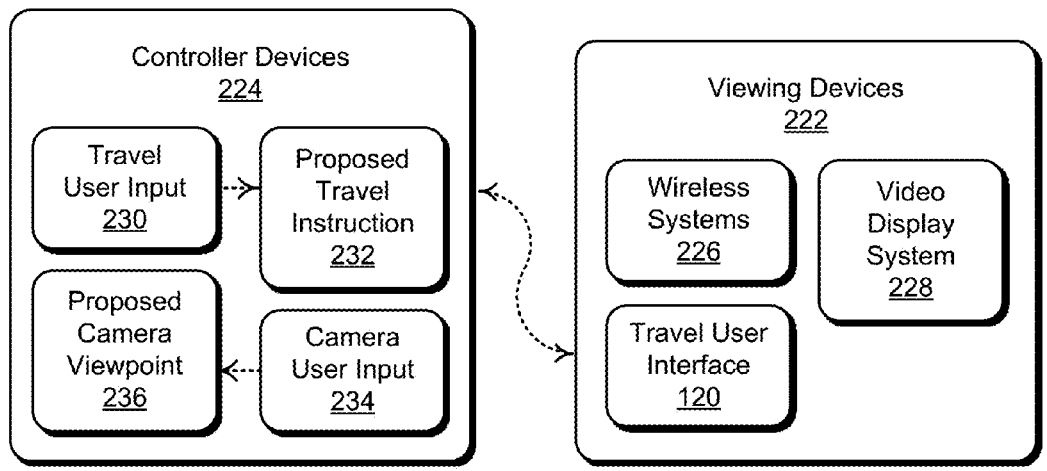

FIG. 2 illustrates an example system 200 in which embodiments of collaborative camera viewpoint control for interactive telepresence can be implemented. The example system 200 includes a vehicle 202, such as the vehicle 102 shown and described with reference to FIG. 1. In implementations, the vehicle 202 may be any one or combination of an unmanned aerial vehicle (a drone), a submersible, a land rover, a mobilized computing device, and/or a camera transport. The vehicle 202 includes a camera system 204 that is implemented to capture the video 206 of the environment in which the vehicle travels, such as when flying as a drone, traveling over land or in a building structure as a land rover, traveling in water as a submersible (e.g., under water or floating on top), or as any other vehicle implemented as a camera transport. The camera system 204 can include one or more camera devices, and the camera devices can operate together to capture the video 206 of the environment from a common viewpoint, or operate independently to each capture the video of the environment from a different viewpoint.

In this example, the vehicle 202 is implemented with various components, such as a processing system 208 and memory 210 (e.g., non-volatile, physical memory), and with any number and combination of differing components as further described with reference to the example device shown in FIG. 6. Although not shown, the vehicle 202 includes a power source, such as a battery, to power the various device components and a propulsion apparatus or system of the vehicle. Further, the vehicle 202 is a wireless communication-enabled device with one or more wireless systems 212 implemented to support several radio access technologies, which may include Wi-Fi, Bluetooth™, Mobile Broadband, LTE, as well as 802.11a/b/g/n/ac network connectivity technologies, and/or any other wireless communication system or format. Generally, the vehicle 202 includes a wireless communication system 212 that includes a radio device, antenna, and chipset that is implemented for wireless communication with other devices, networks, and services.

The vehicle 202 also includes a travel control system 214 that controls the vehicle in the environment in which it travels. The travel control system 214 integrates with the propulsion apparatus or system of the vehicle, and may implemented as software, firmware, hardware (e.g., fixed logic circuitry, motor drives, etc.), or any combination thereof. Similarly, the camera system 204 may include a camera control system (not shown) that integrates to independently control the position of camera devices of the camera system on the vehicle, and the camera control system processes the video for communication to the viewing devices.

The vehicle 202 includes a trajectory planner 216, such as the trajectory planner for the vehicle 102 described with reference to FIG. 1. The trajectory planner 216 can be implemented as a software application or module, such as computer-executable software instructions that are executable with the processing system 208 to implement embodiments of collaborative camera viewpoint control for interactive telepresence. As indicated, the trajectory planner 216 can be stored on computer-readable storage memory (e.g., the memory 210), such as any suitable memory device or electronic data storage implemented in the vehicle. Additionally, the trajectory planner 216 is implemented in this example with a voting system 218 and a policy system 220, both of which are also discussed above with reference to FIG. 1. Although shown as integrated components or modules of the trajectory planner 216, either or both of the voting system 218 and the policy system 220 may be implemented independent of the trajectory planner 216, either in the vehicle 202 and/or in other devices.

The example system 200 includes viewing devices 222 and associated controller devices 224, also as shown and described with reference to FIG. 1. Similar to the vehicle 202 (e.g., in the context of a computing-enabled device), the viewing devices 222 and the controller devices 224 can each be implemented with a processing system and memory (e.g., physical memory), as well as with a power source (e.g., a battery) to power the device components. The memory can maintain software applications, such as device applications and an operating system of the device. Additionally, any of the viewing devices 222 and the controller devices 224 can be implemented with any number and combination of differing components as further described with reference to the example device shown in FIG. 6. The viewing devices 222 and the controller devices 224 can also be wireless communication-enabled devices with one or more wireless systems 226 implemented to support the several radio access technologies described above. In this example, the viewing devices 222 are shown to include the wireless systems 226, and similarly, the controller devices 224 may as well.

The viewing devices 222 also include some form of a video display system 228 to display the video 206 that is captured by the camera system 204 of the vehicle 202. The video 206 is communicated to the viewing devices 222 from the vehicle (e.g., via the network 122), and the video of the environment in which the vehicle travels is displayable to the respective users of the viewing devices on the video display system 228 of the device. The travel user interface 120 can also be displayed over the video 206 on the video display system of a viewing device. As noted above, the viewing devices 222 may be different types of devices, such as any type of a virtual reality headset, virtual reality glasses, an augmented reality headset, augmented reality glasses, a mobile device with an integrated display, and/or a display device coupled to a computing device, and each may have its own form of video display system.

As described, the camera system 204 of the vehicle 202 can also include a camera control system that processes the video 206 for communication to the viewing devices 222. In implementations, the video 206 is captured by the cameras of the camera system 204 from the different viewpoints and image frames of the video are stacked into a combined frame and converted to a YUV color space image format. The combined frame is then compressed as H.264 (e.g., the H.264 protocol as discussed in the ITU-T H.264 Recommendation (February 2014)) and sent over the network 122 (e.g., the Internet) in a real-time transport protocol (RTP) package over user datagram protocol (UDP) or hyper-text transfer protocol (HTTP) to the viewing devices 222 (or utilizing the TCP/IP protocol to connect the client devices and/or the camera system to a cloud-based service). The viewing devices receive the RTP package over UDP or HTTP, and the compressed H.264 frame is unpacked from the RTP package. The compressed frame is then uncompressed and converted to the RGB color space format, which is displayed as the video on the video display system 228 of a viewing device 222.

As described above with reference to FIG. 1, the controller devices 224 are associated with the viewing devices 222 and each can receive a travel user input 230 as a proposed travel instruction to the vehicle 202. Similarly, each of the controller devices 224 can receive a camera user input 234 as a proposed camera viewpoint to reposition the camera system 204, or a camera device of the camera system, that is transported by the vehicle. The group of users of the viewing devices 222 and the controller devices 224 can collaborate to control the viewpoint of the camera system 204 that is transported by the vehicle 202 for an interactive telepresence in the environment in which the vehicle travels. The group of users can interact with the remote environment collaboratively, in the context of crowdsourcing, to control camera movement to reposition the camera viewpoint, and/or to control the vehicle travel to reposition the camera viewpoint. The proposed travel instruction 232 from each user can be collectively communicated to the vehicle 202 as the proposed travel instructions 238. Similarly, the proposed camera viewpoint 236 from each user can be collectively communicated to the vehicle 202 as the proposed camera viewpoints 240.

In this example system 200, the trajectory planner 216 of the vehicle 202 receives the collective proposed travel instructions 238 and generates a consensus travel instruction 242 for the vehicle 202 based on the proposed travel instructions. As described above with reference to FIG. 1, the trajectory planner 216 may be implemented with the voting system 218 to generate the consensus travel instruction 242 based on each of the proposed travel instructions 238 counted as a user vote to direct the travel of the vehicle. Similarly, the trajectory planner 216 may be implemented with the policy system 220 to generate the consensus travel instruction 242 based on each of the proposed travel instructions 238 counted as a weighted vote to direct the travel of the vehicle. The trajectory planner 216 can then communicate the consensus travel instruction 242 to the travel control system 214 effective to instruct the vehicle how to travel (e.g., any one or combination of stop, brake, start, accelerate, turn-off the vehicle, turn-on the vehicle, travel up, travel down, turn left, turn right, turn around, rotate, travel forward, and travel back).

The trajectory planner 216 of the vehicle 202 also receives the collective proposed camera viewpoints 240 and generates a consensus camera viewpoint 244 for one or more cameras of the camera system 204 based on the proposed camera viewpoints. The trajectory planner 216 can utilize the voting system 218 to generate the consensus camera viewpoint 244 based on each of the proposed camera viewpoints 240 counted as a user vote to reposition the camera system. Similarly, the trajectory planner 216 can utilize the policy system 220 to generate the consensus camera viewpoint 244 based on each of the proposed camera viewpoints 240 counted as a weighted vote to reposition the camera system. The trajectory planner 216 can then communicate the consensus camera viewpoint 244 to the camera system 204 effective to reposition the camera system, or one or more cameras of the camera system.

Figure 3:
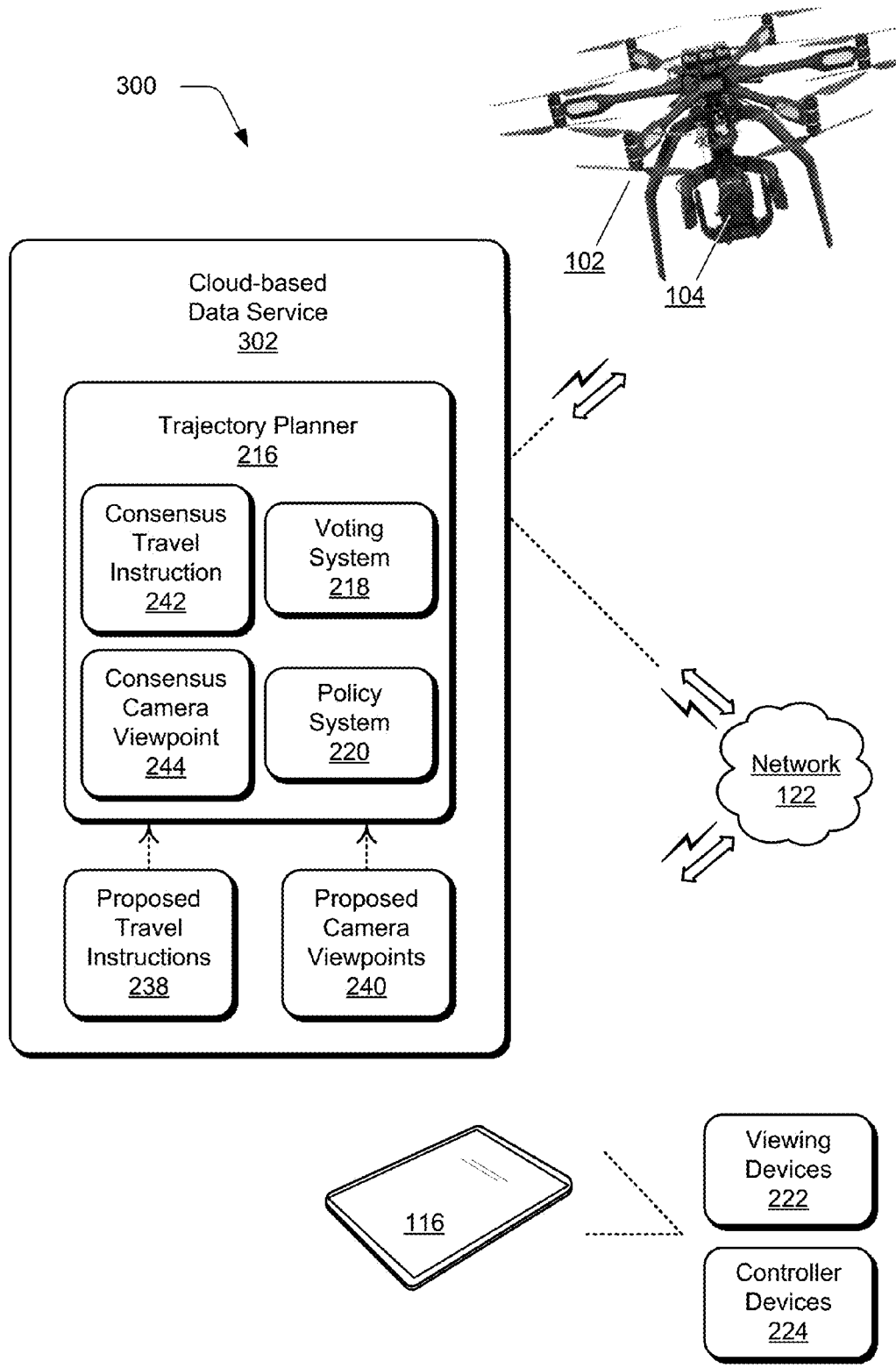
FIG. 3 illustrates another example system in which embodiments of collaborative camera viewpoint control for interactive telepresence can be implemented.

FIG. 3 illustrates another example system 300 in which embodiments of collaborative camera viewpoint control for interactive telepresence can be implemented. The example system 300 includes the vehicle 102 that transports the camera system 104, as shown and described with reference to FIG. 1. The example system 300 includes a cloud-based data service 302 that implements the trajectory planner 216 as a computer application. The cloud-based data service is accessible by the user devices (e.g., the viewing devices 222 and/or the controller devices 224) via the network 122.

The cloud-based data service 302 can include data storage that may be implemented as any suitable memory, memory device, or electronic data storage for network-based data storage. The data storage can maintain an instance of the trajectory planner 216, to include the voting system 218 and the policy system 220, as on-line applications (e.g., as network-based applications) that are accessible by the user devices as well as by the vehicles described herein, such as the vehicle 102. The cloud-based data service 302 can also be implemented with server devices that are representative of one or multiple hardware server devices. Further, the cloud-based data service can be implemented with various components, such as a processing system and memory, as well as with any number and combination of differing components as further described with reference to the example device shown in FIG. 6 to implement the services, applications, servers, and other features of collaborative camera viewpoint control for interactive telepresence.

As described above with reference to FIGS. 1 and 2, the controller devices 224 are associated with the viewing devices 222 and each can receive a travel user input 230 as a proposed travel instruction to the vehicle 102. Similarly, each of the controller devices 224 can receive a camera user input 234 as a proposed camera viewpoint to reposition the camera system 104, or a camera device of the camera system, that is transported by the vehicle. The group of users of the viewing devices 222 and the controller devices 224 can collaborate to control the viewpoint of the camera system 104 that is transported by the vehicle 102 for an interactive telepresence in the environment in which the vehicle travels. The group of users can interact with the remote environment collaboratively, in the context of crowdsourcing to control camera movement to reposition the camera viewpoint, and/or to control the vehicle travel to reposition the camera viewpoint. The proposed travel instruction from each user can be collectively communicated to the cloud-based data service 302 as the proposed travel instructions 238. Similarly, the proposed camera viewpoint from each user can be collectively communicated to the cloud-based data service 302 as the proposed camera viewpoints 240.

In this example system 300, the trajectory planner 216 implemented by the cloud-based data service 302 receives the collective proposed travel instructions 238 and generates the consensus travel instruction 242 for the vehicle 102 based on the proposed travel instructions. As described above, the trajectory planner 216 may be implemented with the voting system 218 to generate the consensus travel instruction 242 based on each of the proposed travel instructions 238 counted as a user vote to direct the travel of the vehicle. Similarly, the trajectory planner 216 may be implemented with the policy system 220 to generate the consensus travel instruction 242 based on each of the proposed travel instructions 238 counted as a weighted vote to direct the travel of the vehicle. The cloud-based data service 302 can then communicate the consensus travel instruction 242 to the travel control system of the vehicle 102 via the network 122 effective to instruct the vehicle how to travel (e.g., any one or combination of stop, brake, start, accelerate, turn-off the vehicle, turn-on the vehicle, travel up, travel down, turn left, turn right, turn around, rotate, travel forward, and travel back).

The trajectory planner 216 implemented by the cloud-based data service 302 can also receive the collective proposed camera viewpoints 240 and generates the consensus camera viewpoint 244 for one or more cameras of the camera system 104 based on the proposed camera viewpoints. The trajectory planner 216 can utilize the voting system 218 to generate the consensus camera viewpoint 244 based on each of the proposed camera viewpoints 240 counted as a user vote to reposition the camera system. Similarly, the trajectory planner 216 can utilize the policy system 220 to generate the consensus camera viewpoint 244 based on each of the proposed camera viewpoints 240 counted as a weighted vote to reposition the camera system. The cloud-based data service 302 can then communicate the consensus camera viewpoint 244 to the camera system 104 of the vehicle 102 via the network 122 effective to reposition the camera system, or one or more cameras of the camera system.

Example methods 400 and 500 are described with reference to respective FIGS. 4 and 5 in accordance with one or more embodiments of collaborative camera viewpoint control for interactive telepresence. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
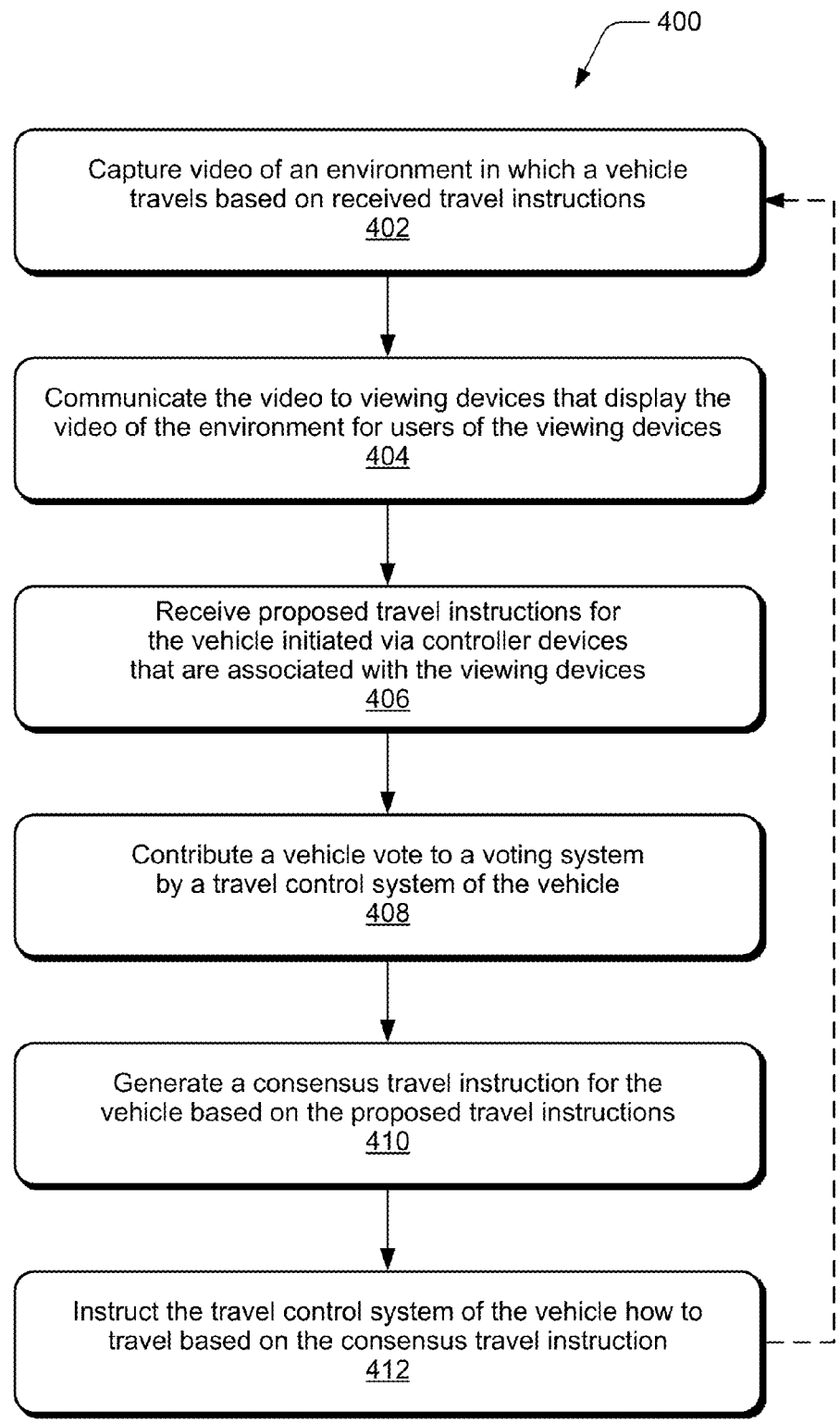
FIG. 4 illustrates example method(s) of collaborative camera viewpoint control for interactive telepresence in accordance with one or more embodiments.

FIG. 4 illustrates example method(s) 400 of collaborative camera viewpoint control for interactive telepresence, and is generally described with reference to a vehicle that transports a camera system. The order in which the method is described is not intended to be construed as a limitation, and any number or combination of the method operations can be performed in any order to implement a method, or an alternate method.

At 402, video is captured of an environment in which a vehicle travels based on received travel instructions. For example, the vehicle 202 (FIG. 2) includes the camera system 204 that captures the video 206 in two-dimensional or three-dimensional space of the environment in which the vehicle travels, such as when flying as a drone, traveling over land or in a building structure as a land rover, traveling in water as a submersible (e.g., under water or floating on top), or as any other vehicle implemented as a camera transport. The camera system 204 can include one or more camera devices, and the camera devices operate together to capture the video of the environment from a common viewpoint, or operate independently to each capture the video of the environment from a different viewpoint. In implementations, multiple cameras of the camera system 204 each capture the video from a different viewpoint of the environment.

At 404, the video is communicated to viewing devices that display the video of the environment for users of the viewing devices. For example, the camera system 204 of the vehicle 202 communicates the video 206 of different viewpoints to the viewing devices 222 that display the video 206 of the environment in which the vehicle travels for respective users of the viewing devices. The video of the environment from a selected one of the viewpoints is displayed to a group of the users that select the particular camera viewpoint. The travel user interface 120 is displayed over the video 206 on the video display system 228 of a viewing device 222, and the travel user interface depicts selectable travel options for the vehicle. The viewing devices 222 may be different types of devices, such as any type of a virtual reality headset, virtual reality glasses, an augmented reality headset, augmented reality glasses, a mobile device with an integrated display, and/or a display device coupled to a computing device.

At 406, proposed travel instructions are received for the vehicle initiated via controller devices that are associated with the viewing devices. For example, the trajectory planner 216 of the vehicle 202 receives the collective proposed travel instructions 238 from the controller devices 224 that are associated with the viewing devices 222. A group of users of the viewing devices 222 and the controller devices 224 collaborate to control the viewpoint of the camera system 204 that is transported by the vehicle 202 for an interactive telepresence in the environment in which the vehicle travels. The proposed travel instruction 232 from each user is selected based on the viewpoint of the video being displayed on a viewing device, and the proposed travel instruction from each user is collectively communicated to the vehicle 202 as the proposed travel instructions 238.

At 408, a vehicle vote is contributed to a voting system by a travel control system of the vehicle. For example, the travel control system 214 of the vehicle 202 generates a voting input to the voting system 218 of the trajectory planner 216 to direct the travel of the vehicle. The voting input of the travel control system 214 can be weighted to account for instances when the consensus travel instruction 242 that is generated based on the group input is overridden, such as for obstacle avoidance by the vehicle.

At 410, a consensus travel instruction is generated for the vehicle based on the proposed travel instructions. For example, the trajectory planner 216 generates the consensus travel instruction 242 for the vehicle 202 based on the proposed travel instructions 238. The trajectory planner 216 utilizes the voting system 218 to generate the consensus travel instruction 242 based on each of the proposed travel instructions 238 (to include the travel control system vote) counted as a user vote to direct the travel of the vehicle. Similarly, the trajectory planner 216 utilizes the policy system 220 to generate the consensus travel instruction 242 based on each of the proposed travel instructions 238 counted as a weighted vote to direct the travel of the vehicle.

At 412, the travel control system of the vehicle is instructed as to how the vehicle is to travel based on the consensus travel instruction. For example, the trajectory planner 216 communicates the consensus travel instruction 242 to the travel control system 214 effective to instruct the vehicle 202 how to travel (e.g., any one or combination of stop, brake, start, accelerate, turn-off the vehicle, turn-on the vehicle, travel up, travel down, turn left, turn right, turn around, rotate, travel forward, and travel back). Optionally, the method 400 can continue at 402 to capture the video of the environment in which a vehicle travels.

Figure 5:
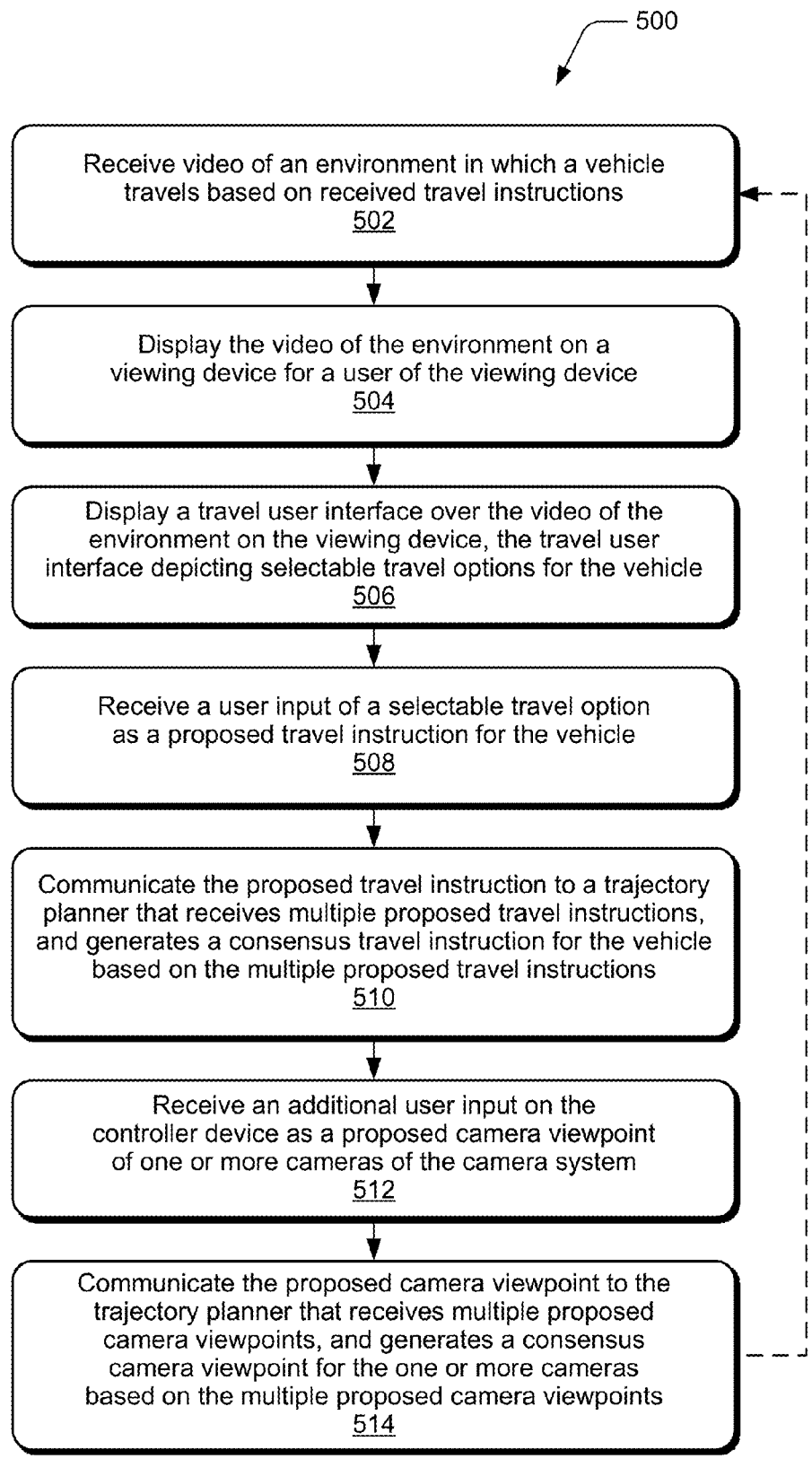
FIG. 5 illustrates example method(s) of collaborative camera viewpoint control for interactive telepresence in accordance with one or more embodiments.

FIG. 5 illustrates example method(s) 500 of collaborative camera viewpoint control for interactive telepresence, and is generally described with reference to viewing devices and controller devices used to collaboratively input proposed travel instructions for a vehicle and/or proposed camera viewpoints to reposition a camera system. The order in which the method is described is not intended to be construed as a limitation, and any number or combination of the method operations can be performed in any order to implement a method, or an alternate method.

At 502, video is received of an environment in which a vehicle travels based on received travel instructions, and at 504, the video of the environment is displayed on a viewing device for a user of the viewing device. For example, the viewing devices 222 receive the video 206 of the environment as captured by the camera system 204 on the vehicle 202, where the camera system includes multiple cameras that each capture the video from a different viewpoint of the environment. The video 206 of the environment is then displayable to any number of users of the viewing devices, and the video of the environment from a selected one of the viewpoints is displayed to a group of the users of the viewing devices. The different viewpoints of the environment from the multiple cameras can be ranked, and the users select the video of the selected viewpoint for display on the viewing devices. In implementations, any of the users may be using different types of the viewing devices 222, such as any type of a virtual reality headset, virtual reality glasses, an augmented reality headset, augmented reality glasses, a mobile device with an integrated display, and/or a display device coupled to a computing device.

At 506, a travel user interface is displayed over the video of the environment on the viewing device, the travel user interface depicting selectable travel options for the vehicle. For example, the travel user interface 120 is displayed over the video 206 on the video display system 228 of a viewing device 222, and the travel user interface depicts the selectable travel options for the vehicle 202. At 508, a user input of a selectable travel option is received as a proposed travel instruction for the vehicle. For example, the controller devices 224 that are associated with the viewing devices 222 each receive a travel user input 230 as a proposed travel instruction to the vehicle 202. The group of users of the viewing devices 222 and the controller devices 224 collaborate to control the viewpoint of the camera system 204 that is transported by the vehicle 202 for an interactive telepresence in the environment in which the vehicle travels.

At 510, the proposed travel instruction is communicated to a trajectory planner that receives multiple proposed travel instructions initiated via multiple controller devices, and generates a consensus travel instruction for the vehicle based on the multiple proposed travel instructions. For example, the proposed travel instruction 232 from each user with a controller device 224 is collectively communicated to the vehicle 202 as the proposed travel instructions 238, and the trajectory planner 216 generates the consensus travel instruction 242 for the vehicle 202 based on the proposed travel instructions.

At 512, an additional user input is received on the controller device as a proposed camera viewpoint of one or more cameras of the camera system. For example, the controller devices 224 that are associated with the viewing devices 222 each receive a camera user input 234 as a proposed camera viewpoint 236 to reposition the camera system 204, or one or more cameras of the camera system. At 514, the proposed camera viewpoint is communicated to the trajectory planner that receives multiple proposed camera viewpoints initiated via the multiple controller devices, and generates a consensus camera viewpoint for the one or more cameras based on the multiple proposed camera viewpoints. For example, the proposed camera viewpoint 236 from each user with a controller device 224 is collectively communicated to the vehicle 202 as the proposed camera viewpoints 240, and the trajectory planner 216 generates the consensus camera viewpoint 244 for the camera system 204 based on the proposed camera viewpoints. Optionally, the method 500 can continue at 502 to receive the video of the environment in which a vehicle travels.

Figure 6:
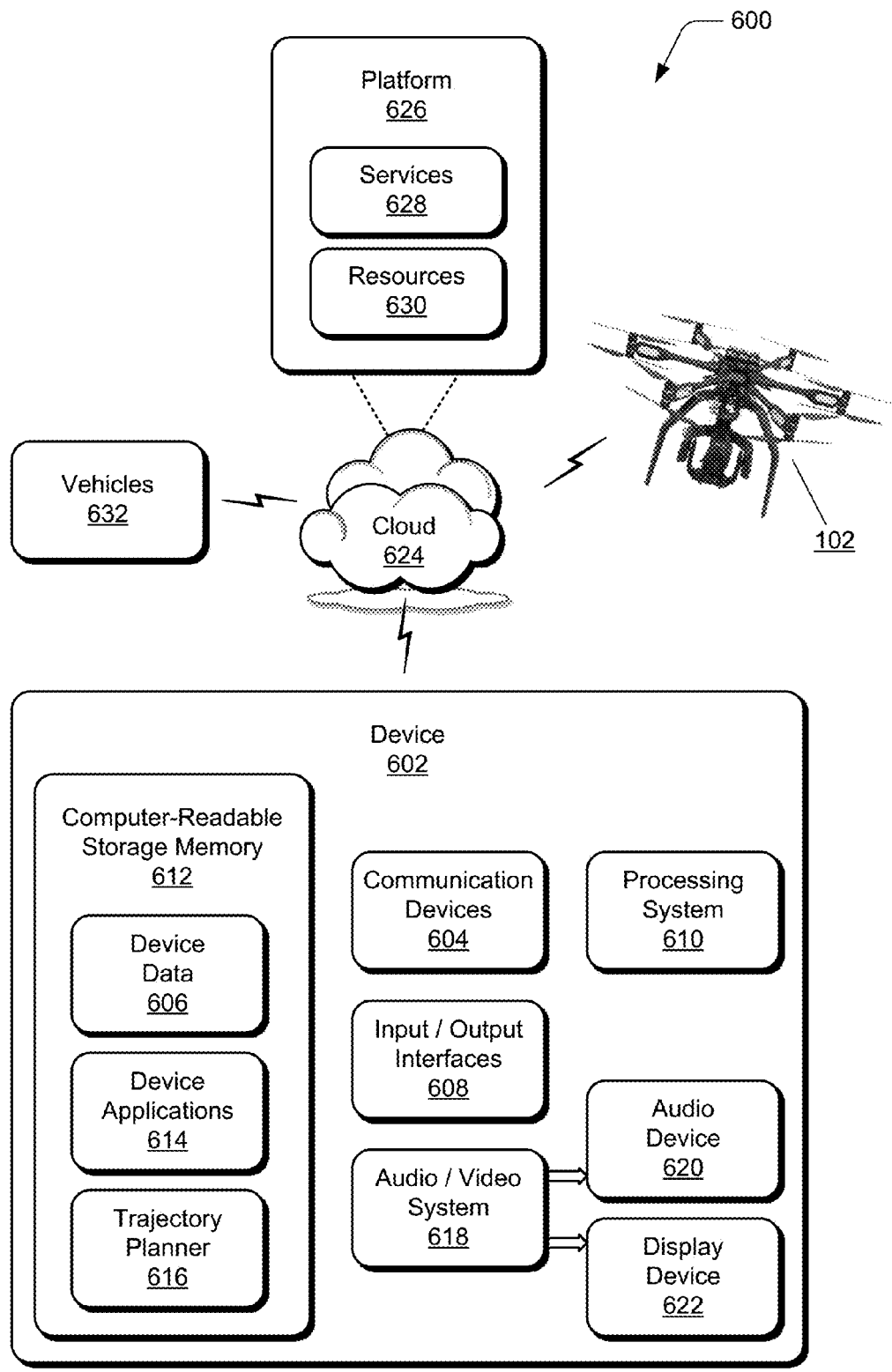
FIG. 6 illustrates an example system with an example device that can implement embodiments of collaborative camera viewpoint control for interactive telepresence.

FIG. 6 illustrates an example system 600 that includes an example device 602, which can implement embodiments of collaborative camera viewpoint control for interactive telepresence. The example device 602 can be implemented as any of the computing devices, user devices, vehicles (e.g., in the context of a computing device), and server devices described with reference to the previous FIGS. 1-5, such as any type of mobile device, wearable device, client device, mobile phone, tablet, computing, communication, entertainment, gaming, media playback, and/or other type of device. For example, the viewing devices, controller devices, and/or vehicles described herein may be implemented as the example device 602 or with various components of the example device.

The device 602 includes communication devices 604 that enable wired and/or wireless communication of device data 606, such as the video data captured by a camera system that is transported by a vehicle, as well as the proposed travel instructions and the proposed camera viewpoints. Additionally, the device data can include any type of audio, video, and/or image data. The communication devices 604 can also include transceivers for cellular phone communication and for network data communication.

The device 602 also includes input/output (I/O) interfaces 608, such as data network interfaces that provide connection and/or communication links between the device, data networks, other devices, and the vehicles described herein. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes a computer-readable storage memory 612, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 612 provides storage of the device data 606 and various device applications 614, such as an operating system that is maintained as a software application with the computer-readable storage memory and executed by the processing system 610. In this example, the device applications include a trajectory planner 616 that implements embodiments of collaborative camera viewpoint control for interactive telepresence, such as when the example device 602 is implemented as a vehicle as described herein with reference to FIGS. 1 and 2, or as part of the cloud-based data service 302 shown and described with reference to FIG. 3. Examples of the trajectory planner 616 include the trajectory planner 216 implemented in the vehicle 202, as described with reference to FIGS. 1-5.

The device 602 also includes an audio and/or video system 618 that generates audio data for an audio device 620 and/or generates display data for a display device 622. The audio device and/or the display device include any devices that process, display, and/or otherwise render audio, video, display, and/or image data. In implementations, the audio device and/or the display device are integrated components of the example device 602. Alternatively, the audio device and/or the display device are external, peripheral components to the example device.

In embodiments, at least part of the techniques described for collaborative camera viewpoint control for interactive telepresence may be implemented in a distributed system, such as over a "cloud" 624 in a platform 626. The cloud 624 includes and/or is representative of the platform 626 for services 628 and/or resources 630. The platform 626 abstracts underlying functionality of hardware, such as server devices (e.g., included in the services 628) and/or software resources (e.g., included as the resources 630), and connects the example device 602 with other devices, servers, vehicles 632, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud.

Although embodiments of collaborative camera viewpoint control for interactive telepresence have been described in language specific to features and/or methods, the appended claims are not necessarily limited to the specific features or methods described. Rather, the specific features and methods are disclosed as example implementations of collaborative camera viewpoint control for interactive telepresence, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following embodiments.

A system implemented for collaborative camera viewpoint control, the system comprising: a vehicle configured for travel based on received travel instructions and configured to capture video of an environment in which the vehicle travels, the vehicle including multiple cameras that each capture the video from a different viewpoint of the environment; viewing devices configured to receive the video of the environment from the different viewpoints, the video of the environment from a selected one of the viewpoints being displayable to users of the viewing devices; controller devices associated with the viewing devices, each of the controller devices configured to receive a user input as a proposed travel instruction for the vehicle; and a trajectory planner configured to receive the proposed travel instructions initiated via the controller devices, and generate a consensus travel instruction for the vehicle based on the proposed travel instructions.

Alternatively or in addition to the above described system, any one or combination of: The different viewpoints of the environment from the multiple cameras are ranked, and wherein the users select the video of the selected viewpoint for display on the viewing devices. The vehicle comprises: a camera system of the multiple cameras configured to capture the video of the environment in which the vehicle travels from the different viewpoints; a travel control system configured to control the travel of the vehicle; and a processor system to execute the trajectory planner as a computer application, the trajectory planner further configured to communicate the consensus travel instruction to the travel control system effective to instruct the vehicle how to said travel. A travel user interface configured to display over the video of the environment on the viewing devices, the travel user interface depicting selectable travel options for the vehicle based on the selected one of the viewpoints of the video that is displayed on the viewing devices. The trajectory planner is implemented with a voting system to generate the consensus travel instruction based on each of the proposed travel instructions counted as a user vote to direct the travel of the vehicle. The vehicle comprises a travel control system configured to control the travel of the vehicle, and the travel control system implemented to generate a voting input to the voting system to direct the travel of the vehicle. The trajectory planner is implemented with a policy system to generate the consensus travel instruction based on each of the proposed travel instructions counted as a weighted vote to direct the travel of the vehicle. The vehicle comprises a camera system of the multiple cameras configured to capture the video of the environment in which the vehicle travels from the different viewpoints; a first group of the viewing devices receive the video of the environment from a first camera having a first viewpoint; at least a second group of the viewing devices receive the video of the environment from at least a second camera having a second viewpoint; and the trajectory planner configured to receive the proposed travel instructions based on the different viewpoints of the environment. The vehicle comprises a camera system of the multiple cameras configured to capture the video of the environment in which the vehicle travels from the different viewpoints; the controller devices are each further configured to receive an additional user input as a proposed camera viewpoint of at least one of the cameras; and the trajectory planner is configured to receive the proposed camera viewpoints initiated via the controller devices, and generate a consensus camera viewpoint for the at least one camera based on the proposed camera viewpoints. A cloud-based data service that implements the trajectory planner as a computer application, the cloud-based data service configured to communicate the consensus travel instruction to a travel control system that controls the travel of the vehicle, the consensus travel instruction effective to instruct the vehicle how to said travel. The controller devices include a mobile device with an integrated display configured to display a travel user interface over the video of the environment, the travel user interface implemented to receive the user input as the proposed travel instruction for the vehicle. The vehicle is at least one of a drone, a submersible, a land rover, a mobilized computing device, a human camera carrier, or a camera transport; and the viewing devices comprise at least one of a virtual reality headset, a virtual reality glasses, an augmented reality headset, an augmented reality glasses, a mobile device with an integrated display, or a display device coupled to a computing device. The trajectory planner is configured to receive the multiple proposed travel instructions to at least one of stop, brake, start, accelerate, turn-off the vehicle, turn-on the vehicle, travel up, travel down, turn left, turn right, turn around, rotate, travel forward, or travel back.

A method for collaborative camera viewpoint control implemented by a vehicle comprises: capturing video of an environment in which the vehicle travels based on received travel instructions, the vehicle including multiple cameras each capturing the video from a different viewpoint of the environment; communicating the video of the different viewpoints to viewing devices that display the video for users of the viewing devices, the video of the environment from a selected one of the viewpoints being displayed; receiving proposed travel instructions for the vehicle initiated via controller devices that are associated with the viewing devices; generating a consensus travel instruction for the vehicle based on the proposed travel instructions; and instructing a travel control system of the vehicle how to travel based on the consensus travel instruction.

Alternatively or in addition to the above described method, any one or combination of: The different viewpoints of the environment from the multiple cameras are ranked, and the users select the video of the selected viewpoint for display on the viewing devices. Receiving the proposed travel instructions for the vehicle initiated via the controller devices is based on the selected one of the viewpoints of the video being displayed; and generating the consensus travel instruction for the vehicle is based on a voting system that counts each of the proposed travel instructions as a user vote to direct the travel of the vehicle. Contributing a vehicle vote to the voting system by the travel control system of the vehicle. Said generating the consensus travel instruction for the vehicle is based on a policy system that counts each of the proposed travel instructions as a weighted vote to direct the travel of the vehicle.

A method for collaborative camera viewpoint control comprises: receiving video of an environment in which a vehicle travels based on received travel instructions, the vehicle including a camera system of multiple cameras that each capture the video from a different viewpoint of the environment; displaying a travel user interface over the video of the environment on a viewing device, the travel user interface depicting selectable travel options for the vehicle based on a selected one of the viewpoints of the video that is displayed on the viewing devices; receiving a user input of a selectable travel option as a proposed travel instruction for the vehicle, the user input of the proposed travel instruction received on a controller device that is associated with the viewing device; communicating the proposed travel instruction to a trajectory planner that receives multiple proposed travel instructions initiated via multiple controller devices, the trajectory planner configured to generate a consensus travel instruction for the vehicle based on the multiple proposed travel instructions.

Alternatively or in addition to the above described method, any one or combination of: Receiving an additional user input on the controller device as a proposed camera viewpoint of one or more cameras of the camera system; and communicating the proposed camera viewpoint to the trajectory planner that receives multiple proposed camera viewpoints initiated via the multiple controller devices, the trajectory planner configured to generate a consensus camera viewpoint for the one or more cameras based on the multiple proposed camera viewpoints. The viewing device comprises one of a virtual reality headset, a virtual reality glasses, an augmented reality headset, an augmented reality glasses, a mobile device with an integrated display, or a display device coupled to a computing device.

The invention claimed is:

1. A system implemented for collaborative camera viewpoint control, the system comprising:
   a trajectory planner configured to:
     receive, from a plurality of controller devices, proposed camera viewpoints;
     weight each proposed camera viewpoint based on a user of a controller device associated with the each proposed camera viewpoint;
     receive, from the plurality of controller devices, proposed travel instructions for a vehicle;
     weight each proposed travel instruction based on the user of the controller device associated with the each proposed travel instruction;
     generate a consensus travel instruction for the vehicle based on the weighted proposed travel instructions;
     generate a consensus camera viewpoint for the vehicle based on the weighted proposed camera viewpoints; and
     communicate the consensus travel instruction and the consensus camera viewpoint to the vehicle.

2. The system as recited in claim 1, wherein the trajectory planner is further configured to:
   rank different viewpoints of an environment of the vehicle from multiple cameras of the vehicle; and
   provide the ranked different viewpoints to the plurality of controller devices, wherein the received proposed camera viewpoints are based on a selection of a ranked different viewpoint.

3. The system as recited in claim 1, wherein the vehicle comprises:
   the trajectory planner;
   a camera system of multiple cameras configured to capture video of an environment in which the vehicle travels from the different viewpoints; and
   a travel control system configured to control the travel of the vehicle based on the consensus travel instruction.

4. The system as recited in claim 1, wherein the trajectory planner is implemented with a voting system to generate the consensus travel instruction based on each of the proposed travel instructions counted as a user vote to direct the travel of the vehicle.

5. The system as recited in claim 3, wherein the vehicle is further configured to:
   transmit to a first group of viewing devices video of the environment from a first camera having a first viewpoint;
   transmit to a second group of viewing devices video of the environment from at least a second camera having a second viewpoint; and
   the trajectory planner configured to receive the proposed travel instructions based on the different viewpoints of the environment.

6. The system as recited in claim 1, wherein the trajectory planner is remote from the vehicle.

7. The system as recited in claim 1, wherein the vehicle is at least one of a drone, a submersible, a land rover, a mobilized computing device, a human camera carrier, or a camera transport.

8. The system as recited in claim 1, wherein the proposed travel instructions comprise at least one of stop, brake, start, accelerate, turn-off the vehicle, turn-on the vehicle, travel up, travel down, turn left, turn right, turn around, rotate, travel forward, or travel back.

9. A method for collaborative camera viewpoint control implemented by a vehicle, the method comprising:
   receiving, from a plurality of controller devices, proposed camera viewpoints;
   weighting each proposed camera viewpoint based on a user of a controller device associated with the each proposed camera viewpoint;
   receiving, from the plurality of controller devices, proposed travel instructions for a vehicle;
   weighting each proposed travel instruction based on the user of the controller device associated with the each proposed travel instruction;
   generating a consensus travel instruction for the vehicle based on the weighted proposed travel instructions;
   generating a consensus camera viewpoint for the vehicle based on the weighted proposed camera viewpoints; and
   communicating the consensus travel instruction and the consensus camera viewpoint to the vehicle.

10. The method as recited in claim 9, further comprising:
    ranking the different viewpoints of an environment of the vehicle from multiple cameras of the vehicle; and
    providing the ranked different viewpoints to the plurality of controller devices, wherein the received proposed camera viewpoints are based on a selection of a ranked different viewpoint.

11. The system as recited in claim 1, further comprising a voting system configured to count user votes based on the received proposed camera viewpoints, wherein the consensus camera viewpoint instruction is determined based on the user votes.

12. The system as recited in claim 11, further comprising a policy system configured to determine the weight for each proposed camera viewpoint based on the user of the controller device associated with the each proposed camera viewpoint.

13. The system as recited in claim 12, wherein the weight for each proposed camera viewpoint is determined based on a user factor.

14. The system as recited in claim 13, wherein the user factor is skill level of the user with a type of the vehicle.

15. The system as recited in claim 12, wherein the policy system is further configured to override a proposed travel instruction such that the overrode proposed travel instruction is not the consensus travel instruction.

16. The system as recited in claim 15, wherein the policy system is further configured to:
   determine the vehicle is flying, wherein the overrode proposed travel instruction is to shut off the vehicle.

17. The method as recited in claim 9, further comprising further counting user votes based on the received proposed camera viewpoints, wherein the consensus camera viewpoint instruction is determined based on the user votes.

18. The method as recited in claim 17, determining the weight for each proposed camera viewpoint based on the user of the controller device associated with the each proposed camera viewpoint.

19. One or more non-transitory computer-readable media storing processor-executable instructions that cause one or more processors to perform operations that provides collaborative camera viewpoint control implemented by a vehicle, the operations comprising:
   receiving, from a plurality of controller devices, proposed camera viewpoints;
   weighting each proposed camera viewpoint based on a user of a controller device associated with the each proposed camera viewpoint;
   receiving, from the plurality of controller devices, proposed travel instructions for a vehicle;
   weighting each proposed travel instruction based on the user of the controller device associated with the each proposed travel instruction;
   generating a consensus travel instruction for the vehicle based on the weighted proposed travel instructions;
   generating a consensus camera viewpoint for the vehicle based on the weighted proposed camera viewpoints; and
   communicating the consensus travel instruction and the consensus camera viewpoint to the vehicle.

20. The one more non-transitory computer-readable media as recited in claim 19, wherein the operations further comprise:
   counting user votes based on the received proposed camera viewpoints, wherein the consensus camera viewpoint instruction is determined based on the user votes; and
   determining the weight for each proposed camera viewpoint based on the user of the controller device associated with the each proposed camera viewpoint.

* * * * *